US007332952B2

(12) United States Patent
McLeod et al.

(10) Patent No.: US 7,332,952 B2
(45) Date of Patent: Feb. 19, 2008

(54) ACCURATE TEMPERATURE MEASUREMENT METHOD FOR LOW BETA TRANSISTORS

(75) Inventors: Scott C. McLeod, Oro Valley, AZ (US); Aniruddha Bashar, Laveen, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 113 days.

(21) Appl. No.: 11/286,706

(22) Filed: Nov. 23, 2005

(65) Prior Publication Data

US 2007/0115042 A1    May 24, 2007

(51) Int. Cl.
*H03K 17/78* (2006.01)
(52) U.S. Cl. .................... 327/512; 327/378
(58) Field of Classification Search .............. None
See application file for complete search history.

(56) References Cited

U.S. PATENT DOCUMENTS

| | | | | |
|---|---|---|---|---|
| 5,149,199 | A * | 9/1992 | Kinoshita et al. | 374/178 |
| 5,198,701 | A * | 3/1993 | Davies et al. | 327/513 |
| 5,258,703 | A | 11/1993 | Pham et al. | |
| 5,982,221 | A * | 11/1999 | Tuthill | 327/512 |
| 6,160,305 | A | 12/2000 | Sanchez | |
| 7,010,440 | B1 * | 3/2006 | Lillis et al. | 702/65 |
| 7,170,334 | B2 * | 1/2007 | Miranda et al. | 327/512 |
| 2007/0001744 | A1 | 1/2007 | Miranda et al. | |

OTHER PUBLICATIONS

"TruTherm Precision Dual Remote Diode Temperature Sensor with SMBus Interface"; Datasheet; Feb. 2005; 4 pages; National Semiconductor Corporation.

* cited by examiner

*Primary Examiner*—Kenneth B. Wells
*Assistant Examiner*—An T. Luu
(74) *Attorney, Agent, or Firm*—Meyertons Hood Kivlin Kowert & Goetzel, P.C.; Jeffrey C. Hood

(57) ABSTRACT

An accurate temperature monitoring system that uses a precision current control circuit to apply accurately ratioed currents to a semiconductor device, which may be a bipolar junction transistor (BJT), used for sensing temperature. A change in base-emitter voltage ($\Delta V_{BE}$) proportional to the temperature of the BJT may be captured and provided to an ADC, which may generate a numeric value corresponding to that temperature. The precision current control circuit may be configured to generate a reference current, capture the base current of the BJT, generate a combined current equivalent to a sum total of the base current and a multiple of the reference current, and provide the combined current to the emitter of the BJT. In response to this combined current, the collector current of the BJT will be equivalent to the multiple of the reference current. The ratios of the various collector currents conducted by the BJT may thus be accurately controlled, leading to more accurate temperature measurements.

37 Claims, 4 Drawing Sheets

ACCURATE TEMPERATURE MEASUREMENT METHOD FOR LOW BETA TRANSISTORS

BACKGROUND OF THE INVENTION

1. Field of the Invention

This invention relates generally to the field of integrated circuit design and, more particularly, to the design of temperature sensor and measurement devices.

2. Description of the Related Art

Many digital systems, especially those that include high-performance, high-speed circuits, are prone to operational variances due to temperature effects. Devices that monitor temperature and voltage are often included as part of such systems in order to maintain the integrity of the system components. Personal computers (PC), signal processors and high-speed graphics adapters, among others, typically benefit from such temperature monitoring circuits. For example, a central processor unit (CPU) that typically "runs hot" as its operating temperature reaches high levels may require a temperature sensor in the PC to insure that it doesn't malfunction or break due to thermal problems.

Often, integrated circuit (IC) solutions designed to measure temperature in a system will monitor the voltage across one or more PN-junctions, for example a diode or multiple diodes at different current densities to extract a temperature value. This method generally involves amplifying (or gaining up) a small voltage generated on the diode(s), and then subtracting voltage from the amplified temperature-dependent voltage in order to center the amplified (gained) value for conversion by an analog-to-digital converter (ADC). In other words, temperature-to-digital conversion for IC-based temperature measuring solutions is often accomplished by measuring a difference in voltage across the terminals of typically identical diodes when different current densities are forced through the PN junctions of the diodes. The resulting change ($\Delta V_{BE}$) in the base-emitter voltage ($V_{BE}$) between the diodes is generally proportional to temperature. (It should be noted that while $V_{BE}$ generally refers to a voltage across the base-emitter junction of a diode-connected transistor and not a voltage across a simple PN-junction diode, for the sake of simplicity, $V_{BE}$ is used herein to refer to the voltage developed across a PN-junction in general.) More specifically, a relationship between $V_{BE}$ and temperature is defined by the equation $$V_{BE} = \eta \frac{kT}{q} \ln \frac{I_C}{I_S} \quad (1)$$

where η is the ideality factor of the PN junction, k is Boltzman's constant, q is the charge of a single electron, T represents absolute temperature, $I_S$ represents saturation current and $I_C$ represents the collector current. A more efficient and precise method of obtaining $\Delta V_{BE}$ is to supply the PN junction of a single diode with two separate and different currents in a predetermined ratio. Consequently, $\Delta V_{BE}$ may be related to temperature by the equation $$\Delta V_{BE} = \eta \frac{kT}{q} \ln(N) \quad (2)$$

where N is a constant representing a pre-selected ratio of the two separate collector currents that are supplied to the PN junction of the diode.

In certain cases, for example when measuring the temperature of a semiconductor device such as a CPU, the PN-junction used in performing the temperature measurement may be comprised in a PNP device configured on the same substrate as the CPU. When using a small geometry process substrate transistor as the PNP device, the β (common-emitter current gain) of the transistor may be very low and may vary over process and temperature, as well as over collector current levels. Typical present day temperature measurement systems operate by applying controlled, ratioed currents to the emitter of a transistor used as the temperature measurement PNP device, and are therefore prone to temperature measurement errors due to the β variation in the transistor.

Other corresponding issues related to the prior art will become apparent to one skilled in the art after comparing such prior art with the present invention as described herein.

SUMMARY OF THE INVENTION

In one set of embodiments, an accurate temperature monitoring system may use a precision current control circuit to apply accurately ratioed currents to a semiconductor device, which may be a bipolar junction transistor (BJT), used for sensing temperature. A change in base-emitter voltage ($\Delta V_{BE}$) proportional to the temperature of the BJT may be captured and provided to an ADC, which may generate a numeric value corresponding to that temperature. The precision current control circuit may be configured to generate a reference current, capture the base current of the BJT, generate a combined current equivalent to a sum total of the base current and a multiple of the reference current, and provide the combined current to the emitter of the BJT. In response to this combined current, the collector current of the BJT will be equivalent to the multiple of the reference current.

In one embodiment, the current control circuit comprises a β compensation circuit configured to generate the emitter current provided to the BJT, and a β detection circuit configured to generate a reference current, which corresponds to the desired collector current to be developed in the BJT used for sensing temperature. The β compensation circuit may operate in at least two states, being configured to generate the emitter current corresponding to a low collector current (for the BJT) in the first state, and to generate the emitter current corresponding to a high collector current in the second state.

In the first state, the base current from the BJT may be fed into the drain of a first NMOS device and mirrored in a second NMOS device. The mirror current, equivalent to the base current, may then be summed with the reference current, and the summed current applied to (drawn from) the drain of a first PMOS device. The summed current may be mirrored in a second PMOS device, which may have its drain coupled to the emitter of the BJT, thereby providing the summed current to the emitter of the BJT. As a result of the emitter current being equivalent to a sum total of the base current and the reference current, the collector current developed in the BJT will be equivalent to the reference current.

In the second state, a specified number (N–1) of parallel-coupled identical NMOS devices may be switched to couple in parallel with the first NMOS device, thereby creating an NMOS array such that the base current from the BJT may be equally split between the respective drains of the individual NMOS devices comprised in the NMOS array. The total number of individual NMOS devices in the NMOS array may reflect the desired ratio between the low collector current and the high collector current. Thus, in the second state, the current mirrored in the second NMOS device may be equivalent to the base current divided by N. The mirror current, equivalent to the base current divided by N, may then be summed with the reference current, and the summed current again applied to (drawn from) the drain of a first PMOS device. In the second state, the summed current may be mirrored N to 1 in a PMOS array comprising N−1 parallel-coupled identical PMOS devices switched to couple in parallel to the second PMOS device, where the respective drains of the individual PMOS devices comprised in the PMOS array may be coupled together, and to the emitter of the BJT, thereby providing an N multiple of the summed current to the emitter of the BJT. As a result of the emitter current being equivalent to a sum total of the base current and N times the reference current, the collector current developed in the BJT will be equivalent to an N multiple of the reference current.

The β detection circuit may be operated to optimally set the reference current (and thus the collector current for the BJT) such that the emitter current generated by the β compensation circuit through the PMOS array is maximized but not overdriven. Maximizing the emitter current, and hence the collector current, may provide the added benefit of reducing the effects of electromagnetic interference (EMI) on the temperature measurement, and maximizing the amount of filtering capacitance that may be coupled across the base emitter junction of the BJT. In addition, the larger the current in the PMOS array, the less current ratio error may be incurred as a result of PMOS device mismatch, which may also translate to a considerable reduction in temperature measurement errors. In one embodiment, the β detection circuit may be configured to set the reference current to a low initial value, and progressively increase the value of the reference current, until the summed current (equivalent to the sum total of the base current and the reference current, and applied to the drain of the first PMOS device comprised in the β compensation circuit) exceeds a previously determined optimal value. In one embodiment, the reference current is increased in steps, where each step corresponds to a specified unit value, for example 1 μA. Once the summed current exceeds the previously determined optimal value, the value of the reference current may be reduced by a unit step, and may be held at the thus obtained value for the duration of the temperature conversion.

The ratios of the various collector currents conducted by the BJT may thus be accurately controlled, leading to more accurate temperature measurements.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
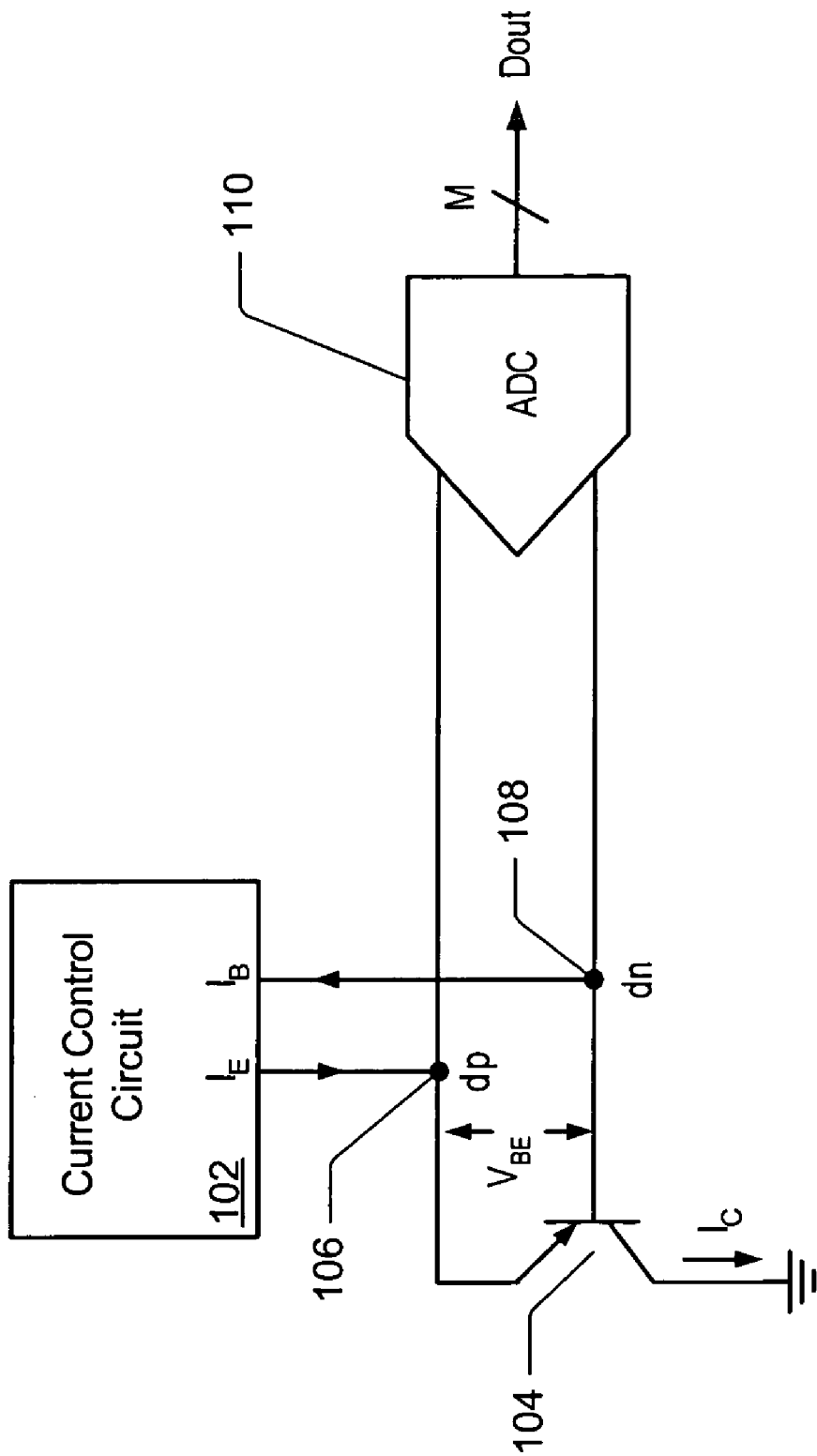
FIG. 1 illustrates a temperature measurement system that utilizes an ADC and a current control circuit in accordance with principles of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, the word "alternately" is meant to imply passing back and forth from (or between) one state, action, or place to another state, action, or place, respectively. For example, "alternately closing and opening a switch" would mean closing the switch, then opening the switch, then closing the switch, then opening the switch, and so on.

A "PN-junction-voltage" ($V_{BE}$) refers to a voltage measured across a PN-junction, or a difference in voltage between a voltage measured at the anode of the PN-junction with respect to a common ground and a voltage measured at the cathode of the PN-junction with respect to the common ground. A "change in PN-junction-voltage" ($\Delta V_{BE}$) refers to a change in PN-junction-voltage for a chosen PN-junction, either in time or in different circuit configurations. For example, if in one circuit configuration $V_{BE}$=700 mV for a PN-junction, and in a different circuit configuration $V_{BE}$=655 mV for the PN-junction, then $\Delta V_{BE}$=45 mV for the PN-junction when referencing to the two different circuit configurations. Similarly, for example, if at a time point t1 $V_{BE}$=650 mV for a PN-junction, and at a time point t2 $V_{BE}$=702 mV for the PN-junction, then $\Delta V_{BE}$=52 mV for the PN-junction when referencing time points t1 and t2. "Storing" a $V_{BE}$ or $V_{BE}$ value in an integrator generally refers to developing a charge corresponding to the $V_{BE}$ value within the integrator. "Adding" and/or "subtracting" a $V_{BE}$ or $V_{BE}$ value in the integrator generally refers to increasing and/or decreasing the developed charge within the integrator, correspondingly to the $V_{BE}$ value. A PN-junction may be comprised in a base-emitter junction of a bipolar junction transistor (BJT). Various embodiments of the circuit are described as utilizing a BJT. However, in other embodiments, the operation performed by the BJT may be achieved through PN-junctions (or NP-junctions) present in devices other than a BJT, having characteristics similar to that of a BJT.

Considering a high collector current and a low collector current as the two separate and different currents in a pre-selected ratio, equation 2 may be re-written as:

$$\Delta V_{BE} = \eta \frac{kT}{q} \ln\left(\frac{I_{CH}}{I_{CL}}\right), \quad (3)$$

where $I_{CH}$ represents the high collector current and $I_{CL}$ represents the low collector current, where $$I_{CH} = N * I_{CL}. \quad (4)$$

The relationship between the emitter current $I_E$ and the collector current $I_C$ is given by:

$$I_C = I_E\left(\frac{\beta}{1+\beta}\right). \quad (5)$$

Considering a gain of $\beta$ for the transistor at the high current, with a $\Delta\beta$ change in $\beta$ when switching from the high current to the low current, the following relationships can be obtained from equation 5:

$$I_{CH} = N * I_E\left(\frac{\beta}{1+\beta}\right) \quad (6)$$

$$I_{CL} = I_E\left(\frac{\beta + \Delta\beta}{1 + \beta + \Delta\beta}\right), \quad (7)$$

where $I_E$ is the unit emitter current corresponding to $I_{CL}$, multiplied by 'N' in equation 6 according to equation 4 in order for the relationship established in equation 5 to be satisfied. Equation 3 can then be re-written, substituting the corresponding expressions from equations 6 and 7 for $I_{CH}$ and $I_{CL}$, respectively.

$$\Delta V_{BE} = \eta \frac{kT}{q} \ln(N) + \eta \frac{kT}{q} \ln\left(\frac{\beta*(1+\beta+\Delta\beta)}{(1+\beta)*(\beta+\Delta\beta)}\right). \quad (8)$$

In equation 8, $\Delta V_{BE}$ corresponds to the correct (expected) measured temperature plus a temperature error incurred as a result of $\Delta\beta$. The first term on the right hand side of equation 8 represents the expected $\Delta V_{BE}$ without error, and the second term is the error term resulting from a change in the $\beta$ of the transistor ($\Delta\beta$). As indicated in equation 8, as $\Delta\beta$ goes to zero, the error term is eliminated. Note also, that even for a finite $\Delta\beta$ value, large values of $\beta$ will result in a smaller error term. However, in the case of small geometry process substrate transistors having small values of $\beta$, a finite $\Delta\beta$ value will have a greater effect on the overall value of $\Delta V_{BE}$, and will thus lead to increased measurement errors.

FIG. 1 illustrates a block diagram of one embodiment of a temperature sensor system implemented in accordance with the present invention. In the embodiment shown, current control circuit 102 is used to control emitter current $I_E$ and collector current $I_C$ in BJT 104, according to base current $I_B$ of BJT 104 that is received by current control circuit 102. BJT 104 may be coupled to the inputs of ADC 110 as shown. For more detail on possible embodiments of ADC 110 and the coupling of BJT 104 to ADC 110, please refer to U.S. Pat. No. 6,847,319 titled "Temperature-to-Digital Converter" invented by Troy L. Stockstad, which is hereby incorporated by reference in its entirety as though fully and completely set forth herein. In one set of embodiments, current control circuit 102 may be operated to alternately develop a high $I_C$ current and a low $I_C$ current—$I_{CH}$ and $I_{CL}$, respectively, in equation 3—in BJT 104, with the resulting $\Delta V_{BE}$ developed across the base-emitter junction of BJT 104 used by ADC 110 to generate a numeric (digital) value corresponding to the temperature of BJT 104. ADC 110 may provide an M-bit output, where M may be selected based on the desired resolution of the digital value. In one set of embodiments, the value of $I_{CH}$ may be an N-multiple of the value of $I_{CL}$, as also shown in equation 4.

Figure 2:
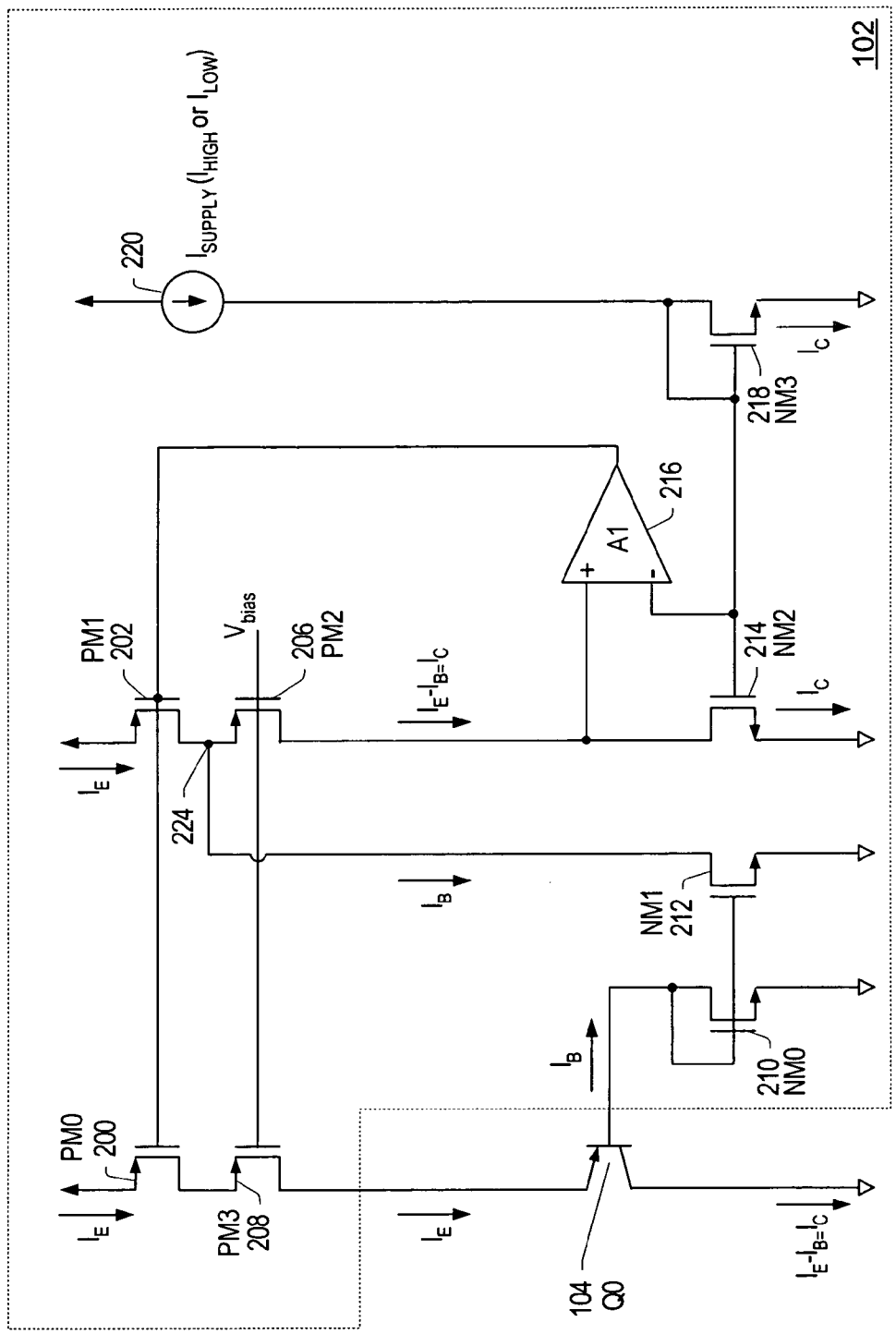
FIG. 2 illustrates one embodiment of a current control circuit.

FIG. 2 shows one possible embodiment of current control circuit 102, used for establishing $I_E$ and $I_C$ in BJT 104, according to $I_B$. PMOS transistor 200 may be configured to provide the emitter current $I_E$ to BJT 104. PMOS device 202 may be configured to mirror this emitter current. In other words, PMOS device 202 may be coupled to PMOS device 200 such that a current flowing into the source of PMOS device 200 is replicated by PMOS device 202, where the current flowing into the source of PMOS device 202 is equivalent to the current flowing into the source of PMOS device 200. Those skilled in the art will appreciate that the value of an equivalent mirror current may typically be within 1% of the value of the mirrored current, and that various techniques may be employed to minimize or eliminate mismatch errors between PMOS devices 200 and 202. Such mismatch errors may be present due to fabrication process variations, for example, and may be remedied using well known methods in the art such as dynamic element matching (DEM), for example. The base of BJT 104 may be coupled to NMOS device 210, effectively applying $I_B$ to the drain and coupled gate of NMOS device 210.

In one embodiment, NMOS device 212 is coupled to NMOS device 210 to mirror the base current $I_B$ that is conducted by NMOS device 210. That is, the current flowing into the drain of NMOS device 212 may be equivalent to the $I_B$ current conducted by NMOS device 210. NMOS device 212 may further be configured to couple to node 224, which may couple the drain of PMOS device 202 to the source of PMOS device 206, NMOS device 212 thereby pulling a current equivalent to $I_B$ from node 224. This results in a current equivalent to $I_E$-$I_B$ flowing out of the drain of PMOS device 206, which by definition is equivalent to the collector current $I_C$ conducted by BJT 104. Current source 220 may be configured to provide a supply current $I_{SUPPLY}$ to NMOS device 218. The supply current may be switched between values representing $I_{HIGH}$ or $I_{LOW}$, that is, a desired high collector current $I_{CH}$ and low collector current $I_{CL}$, respectively, for BJT 104. NMOS device 214 may be configured to mirror the current conducted by PMOS device 218, with the drain of PMOS device 206 coupled to the drain of NMOS device 214 forming a high impedance node that may drive non-inverting input of amplifier 216. In one embodiment, the output of amplifier 216 is configured to drive the gates of PMOS devices 202 and 200, thereby adjusting the emitter current $I_E$ flowing into BJT 104 such that the collector current $I_C$ flowing out of BJT 104 is equivalent to the current ($I_{HIGH}$ or $I_{LOW}$) flowing in NMOS device 218. Current source 220 may be configured to provide accurately ratioed currents (that is, satisfying equation 4), resulting in accurately ratioed collector currents being developed in BJT 104. By controlling the collector current developed in BJT 104, $\beta$-errors may be greatly reduced and/or eliminated during temperature measurements.

Figure 3:
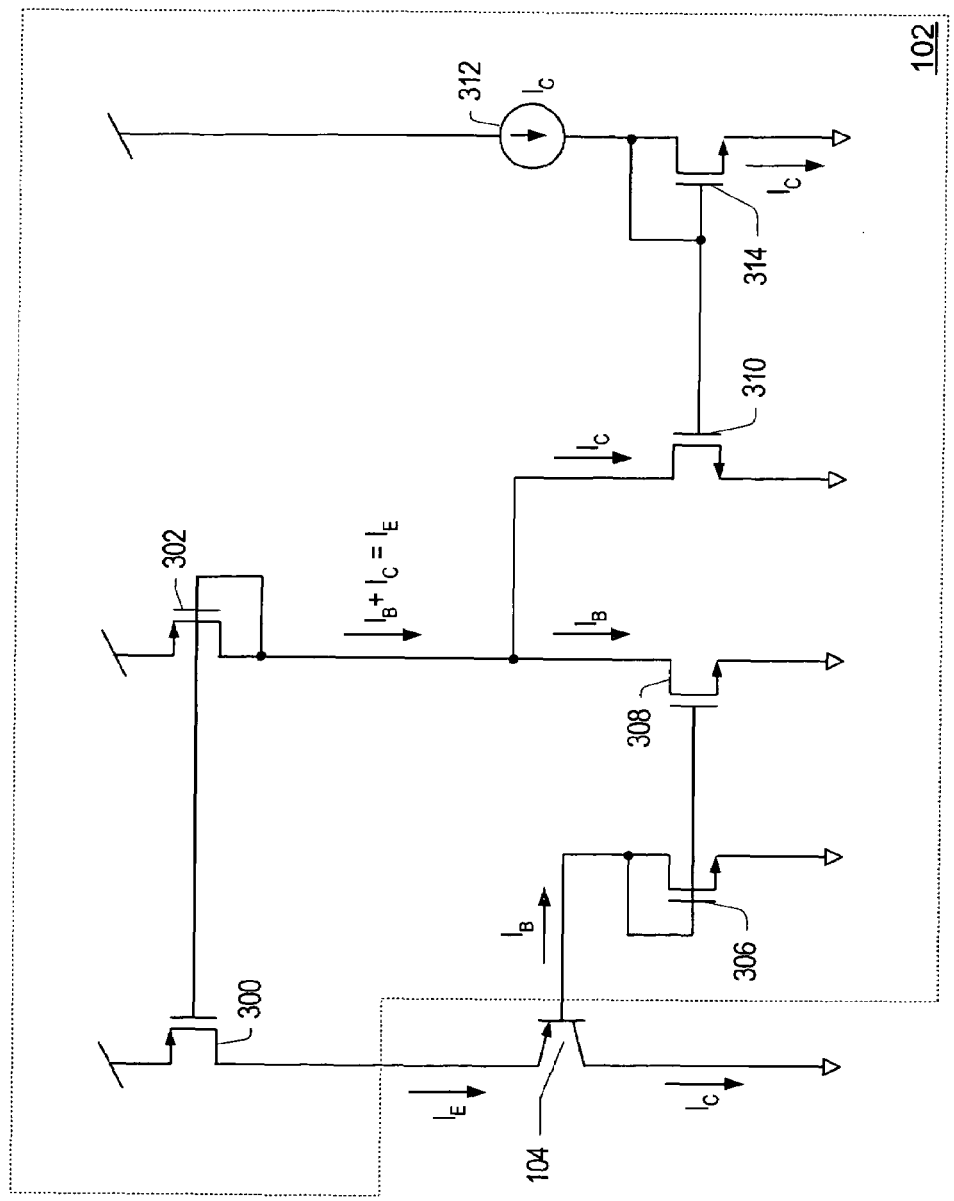
FIG. 3 illustrates an alternate embodiment of a current control circuit.

FIG. 3 shows an alternate embodiment of current control circuit 102. In this embodiment, current $I_E$ is provided to BJT 104 by PMOS device 300, which is coupled to the emitter of BJT 104 as shown. The base current from BJT 104 may flow into NMOS device 306, and may be mirrored by NMOS device 308, such that the current flowing into the drain of NMOS device 308 is equivalent to $I_B$ flowing into the drain of NMOS device 306. Current source 312 may be configured to provide a current to NMOS device 314, which may be mirrored by NMOS device 310, such that the current flowing into the drain of NMOS device 310 is equivalent to the current $I_C$ conducted by NMOS device 314. $I_C$ and $I_B$ may be effectively summed together by coupling the drain of NMOS device 308 and the drain of NMOS device 310 together, the resulting current ($I_B+I_C=I_E$) being drawn from PMOS device 302, and mirrored by PMOS device 300. The collector current flowing out of BJT 104 may therefore be controlled and/or kept constant regardless of the β of BJT 104.

To provide ratioed collector currents ($I_{CH}$ and $I_{CL}$), current source 312 may be configured to be capable of providing two ratioed currents, or PMOS device 300 and NMOS device 306 may each be replaced by corresponding parallel-coupled PMOS and NMOS device arrays, respectively. In one set of embodiments, parallel-coupling the NMOS devices comprises coupling the gates of the NMOS devices together, coupling the drains of the NMOS devices together, and coupling the sources of the NMOS devices together (in the embodiment shown in FIG. 3, the respective source of each of the parallel-coupled NMOS devices is coupled to ground). Similarly, parallel-coupling the PMOS devices may comprise coupling the gates of the PMOS devices together, coupling the drains of the PMOS devices together, and coupling the sources of the PMOS devices together (in the embodiment shown in FIG. 3, the respective source of each of the parallel-coupled PMOS devices is coupled to the supply voltage). These PMOS and NMOS device arrays may be configured to allow switching back and forth between a single device conducting current and N devices conducting current, with the current provided by current source 312 remaining constant. With N devices in the circuit for both the PMOS device array (replacing PMOS device 300) and the NMOS device array (replacing NMOS device 306), $I_B$ may flow into the NMOS device array and may be mirrored N-to-1 in NMOS device 308, such that the current flowing into the drain of NMOS device 308 is equivalent to $I_B$ divided by N. The current supplied by NMOS device 308 and NMOS device 310 to PMOS device 302 may then become $I_B/N+I_C$. This current may be mirrored 1-to-N by the PMOS device array, where the current flowing into the emitter of BJT 104 would be $I_B+N*I_C$. Hence, the collector current $I_C$ in BJT 104 may be $N*I_C$, and $I_C$ when the NMOS array and PMOS array are each switched to only a respective single device conducting current. This is illustrated in FIG. 4 as part of β compensation circuit 416.

Figure 4:
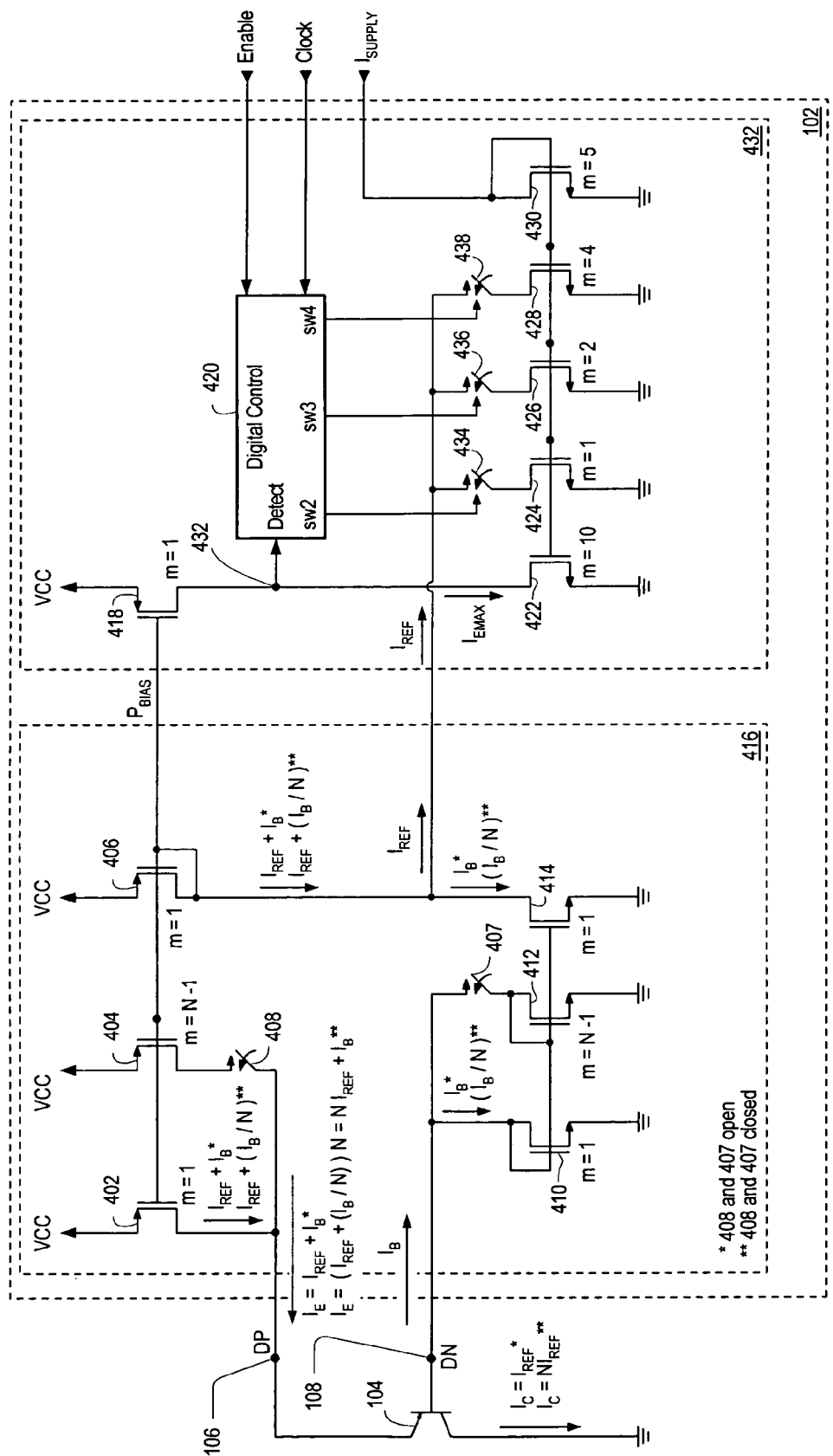
FIG. 4 illustrates one embodiment of a current control circuit comprising a beta compensation component combining with a beta detection component.

FIG. 4 shows yet another embodiment of current control circuit 102, comprising a β compensation circuit 416, and a β detection circuit 432 configured to generate reference current $I_{REF}$, which corresponds to the desired $I_{CL}$ in BJT 104. Circuit 416 may operate in two states, with the first state having switches 407 and 408 open. While in the state where switches 407 and 408 are open, the base current, $I_B$ flowing from the base of BJT 104 may be applied to DN pin 108 of circuit 416. $I_B$ may consequently be applied to the drain of NMOS device 410, and may be mirrored, one for one, by NMOS device 414, thereby establishing a current equivalent to $I_B$ flowing into the drain of NMOS device 414. This equivalent current may be summed with $I_{REF}$ generated by circuit 432, resulting in a combined current of ($I_{REF}+I_B$). This combined current may be drawn from PMOS device 406, and may be mirrored, one for one, by PMOS device 402, thereby establishing a current equivalent to ($I_{REF}+I_B$) flowing out of pin DP 106, and into the emitter of BJT 104. When the emitter current $I_E$ of BJT 104 is equivalent to $I_{REF}+I_B$, by definition ($I_E=I_C+I_B$), $I_C$ is equivalent to $I_{REF}$.

As shown in FIG. 4, circuits 416 and 432 may both comprise single NMOS and/or PMOS devices and parallel-coupled NMOS and/or PMOS arrays. The number of individual devices is indicated by the value of 'm' in each case. For example, PMOS device 402 represents a single PMOS device, while PMOS 404 may represent 'N−1' parallel-coupled PMOS devices, where 'N' represents the ratio between $I_{CH}$ and $I_{CL}$ as defined in equation 4. The respective gates of the individual PMOS devices comprised in PMOS array 404 may be coupled together and to the gate of single PMOS device 402, while the respective drains of the individual PMOS devices comprised in PMOS array 404 may each be coupled to the drain of PMOS device 402 via switch 408. It should be noted that switch 408 may be representative of 'N−1' switches, each switch configured to couple the drain of a respective PMOS device comprised in PMOS array 404. NMOS 412 may similarly represent 'N−1' parallel-coupled NMOS devices coupled to NMOS device 410 in a manner similar to that described for PMOS array 404. NMOS array 412 may be switchably coupled using switch 407, which may represent 'N−1' number of switches, one switch for the respective drain of each NMOS device comprised in NMOS array 412.

While in the state where switches 407 and 408 are closed, the base current, $I_B$ of BJT 104 may flow out of the base of BJT 104 and into DN pin 108 of circuit 416. $I_B$ may be distributed between the respective drains of NMOS device 410 and the 'N−1' NMOS devices comprised in NMOS array 412. In one set of embodiments, in order to obtain substantially equivalent currents flowing into the drain of NMOS device 410 and the respective drains of the individual devices of NMOS array 412, NMOS device 410 and the individual devices of NMOS array 412 may be designed to be identical. PMOS device 402 and the individual devices of PMOS array 404 may similarly be designed to be identical. $I_B$ may be mirrored, one for N, by NMOS device 414. That is, the mirror current flowing into the drain of NMOS device 414 may be equivalent to $I_B/N$, which represents the value of an individual current flowing into the drain of NMOS device 410 or the respective drain of any of the NMOS devices comprised in NMOS array 412. This mirror current, equivalent to $I_B/N$, may be summed with $I_{REF}$ generated by circuit 432, resulting in a combined current of ($I_{REF}+I_B/N$). This combined current may be drawn from PMOS device 406, and may be collectively mirrored, N for one, by PMOS device 402 and PMOS array 404, thereby establishing a current equivalent to ($N*I_{REF}+I_B$) flowing out of pin DP 106, and into the emitter of BJT 104. When the emitter current $I_E$ of BJT 104 is equivalent to $N*I_{REF}+I_B$, by definition ($I_E=I_C+I_B$), $I_C$ is equivalent to $N*I_{REF}$.

Circuit 416 may therefore be operated to accurately control the collector current in BJT 104, since $I_C$ will be equivalent to $I_{REF}$ or a multiple of $I_{REF}$. This multiple, or ratio, may be determined by the mirror ratio used when configuring NMOS array 412 and/or PMOS array 404. The respective number of—preferably identical—devices used in configuring each array, NMOS array 412 and/or PMOS array 404, may determine the actual collector current ratio. In the embodiment shown, the ratio of $I_{CH}$ and $I_{CL}$ is 'N'. By using this technique, the impact that the β of BJT 104 has on temperature readings and accuracy may be greatly reduced and/or eliminated.

The embodiment of current control circuit 102 shown in FIG. 4 also features a β detection circuit 432, which may be operated to optimally set the collector current $I_{REF}$ such that the emitter current $I_E$, obtained collectively from PMOS device 402 and PMOS array 404, is maximized but not overdriven. Maximizing the emitter current $I_E$, and hence the collector current $I_C$, may provide the added benefit of reducing the effects of electromagnetic interference (EMI) on the temperature measurement, and maximizing the amount of filtering capacitance that may be coupled across the base emitter junction of BJT 104. In addition, the larger the current in PMOS device 402 and/or the individual devices comprised in PMOS array 404, the less current ratio error may be incurred as a result of PMOS device mismatch, which may also translate to a considerable reduction in temperature measurement errors. It should be noted that if too much current is drawn from PMOS device 406, PMOS device 402 and/or any and/or all devices comprised in PMOS array 404 may operate in the ohmic region instead of remaining in saturation. This may compromise the accuracy of mirroring the current from PMOS device 406, and lead to potentially sizeable temperature measurement errors as a result. For any given collector current $I_{REF}$, the emitter current $I_E$ will be a function of the β of BJT 104, as defined in equation 5. Because β may be for the most part unknown to the user, and because it may change as a function of temperature, it may be desired to have an automated way to optimally set the low collector current $I_{CL}$ of BJT 104 (in effect, by optimally setting $I_{REF}$) such that the emitter current $I_E$ of BJT 104 is close to its optimum value.

As shown in FIG. 4, circuit 432 may be configured with four NMOS arrays 422, 426, 428, and 430, and single NMOS device 424. As before, each NMOS array may comprise a specified number of parallel-coupled NMOS devices, the specified number indicated by the respective value of 'm' in each case. For example, NMOS array 422 may comprise ten identical, parallel-coupled NMOS devices, NMOS array 426 may comprise two identical, parallel-coupled NMOS devices, and so on. By way of example, if PMOS device 402 and PMOS array 404 are determined to operate most accurately when the low collector current $I_{CL}$ of BJT 104 is at 10 μA, then the initial value $I_{EMAX}$ of the total drain current of NMOS array 422 may be set to 10 μA. In one embodiment, $I_{EMAX}$ is set by setting $I_{SUPPLY}$ to 5 μA, and applying that 5 μA current to the drain of NMOS array 430. The drain current of NMOS array 430 may then be mirrored two to one by NMOS array 422, effectively setting $I_{EMAX}$ flowing into the drain of NMOS array 422 to 10 μA. The Enable signal may be asserted to initiate the β detection process, and the Clock signal may be used to time the logic sequence in Digital Control block 420. Once the Enable signal has been asserted, switches 434, 436 and 438 may stepped in a binary sequence via control outputs sw2, sw3 and sw4, respectively, where control output sw2 may be configured as the least significant bit (LSB), and control output sw4 may be configured as the most significant bit (MSB), thereby providing a way for incrementing $I_{REF}$ from 1 μA to 7 μA in 1 μA steps. In other words, NMOS device 424 in conjunction with switch 434 and control output sw2 may provide a 1 μA step, while NMOS array 426 in conjunction with switch 436 and control output sw3 may provide a 2 μA step, and NMOS array 428 in conjunction with switch 438 and control output sw4 may provide a 4 μA step.

It should be noted again that the value of 10 μA is provided only as an example, and this value may be any specified value determined as the desired value of $I_E$ corresponding to the low collector current $I_{CL}$ of BJT 104, and to be applied to the emitter of BJT 104. Thus, the value of $I_{SUPPLY}$ and the number of individual devices in each of the NMOS arrays (for example 422, 426, 428, 430) may be set in accordance with the desired step increment and the determined initial value $I_{EMAX}$ for a corresponding desired $I_E$ for BJT 104.

Still referring to FIG. 4, as $I_{REF}$ is incremented, or stepped up, the current drawn from PMOS device 406 may increase, and may be mirrored, one to one, by PMOS device 418. Meaning, again, that the current flowing from the drain of PMOS device 418 may be equivalent to the current flowing from the drain of PMOS device 406. When the current in PMOS device 406, and hence in PMOS device 428, exceeds 10 μA, or the specified value, node 432 connected to the "Detect" port of digital control block 420 transitions (in this case from low voltage to high voltage), resulting in digital control block 420 no longer incrementing $I_{REF}$, thereby halting the β detection process. Once this occurs, $I_{REF}$ may be decremented by 1 μA, where it may remain for the duration of the temperature conversion. $I_{REF}$ may therefore be set such that the emitter current $I_E$ from the PMOS mirror comprising PMOS device 410 and PMOS array 404 is as close to its optimal value (in this case determined to be 10 μA) without exceeding it. Alternative ways of generating and incrementing $I_{REF}$ are possible and while not shown, are contemplated.

Thus, various embodiments of the systems and methods described above may facilitate the design of a temperature sensor system that uses a current control circuit to provide accurately ratioed currents to a low-β, transistor used to obtain temperature information, by controlling the collector current developed in the transistor.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method for controlling current in a semiconductor device, the method comprising:
 generating a reference current;
 capturing a control current flowing through a control terminal of the semiconductor device;
 summing the control current with a multiple of the reference current to obtain an input current; and
 applying the input current to an input terminal of the semiconductor device;
 wherein in response to said applying the input current, a device current flowing through an output terminal of the semiconductor device is equivalent to the multiple of the reference current.

2. The method of claim 1, wherein said capturing the control current comprises:
 applying the control current to an input terminal of a first transistor; and
 mirroring the control current in a second transistor to obtain a first mirror current flowing through an input terminal of the second transistor, wherein the first mirror current is equivalent to the control current.

3. The method of claim 2, wherein said summing the control current with the multiple of the reference current comprises:
 capturing an output current flowing through an output terminal of a third transistor, wherein the output current is a sum of the first mirror current and the reference current; and
 mirroring the output current in a fourth transistor to obtain a second mirror current flowing through an output terminal of the fourth transistor, wherein the second mirror current is equivalent to the output current.

4. The method of claim 3, wherein said applying the input current to the input terminal of the semiconductor device comprises applying the second mirror current to the input terminal of the semiconductor device.

5. The method of claim 1, wherein the multiple of the reference current is equivalent to the reference current multiplied by N.

6. The method of claim 1, wherein each component current of the N component currents is equivalent to the control current divided N.

7. The method of claim 1, wherein said capturing the control current further comprises mirroring the at least one component current in a second transistor to obtain a first mirror current flowing through an input terminal of the second transistor, wherein the first mirror current is equivalent to the at least one component current.

8. The method of claim 7, wherein said summing the control current with the multiple of the reference current comprises:
  capturing an output current flowing through an output terminal of a third transistor, wherein the output current is a sum of the first mirror current and the reference current; and
  mirroring the output current in each one of N output mirror transistors to obtain N component mirror currents, each one of the N component mirror currents flowing through a corresponding output terminal of a respective one of the N output mirror transistors, wherein each one of the N component mirror currents is equivalent to the output current; and
  summing the N component mirror currents to obtain a total mirror current.

9. The method of claim 8, wherein said applying the input current to the input terminal of the semiconductor device comprises applying the total mirror current to the input terminal of the semiconductor device.

10. The method of claim 8, wherein said generating the reference current comprises adjusting the reference current to bring the total mirror current to an optimum value, wherein the optimum value represents a maximum total mirror current at which each one of the N output mirror transistors still operates in saturation mode.

11. The method of claim 10, wherein said adjusting the reference current comprises:
  setting the reference current to an initial value to obtain the output current;
  monitoring the output current;
  incrementing the reference current by a specified amount; and
  performing said incrementing a plurality of times until the output current exceeds a predetermined value.

12. The method of claim 11, wherein said adjusting the reference current farther comprises decrementing the reference current by the specified amount following the output current having exceeded the predetermined value.

13. A system for controlling current in a semiconductor device, the system comprising:
  a first circuit configured to generate a reference current;
  a second circuit coupled to the first circuit, and operable to receive a control current flowing through a control terminal of the semiconductor device; and
  a third circuit coupled to the first circuit and to the second circuit, and operable to generate a combined current equivalent to a sum total of the control current and a multiple of the reference current, and further operable to provide the combined current to an input terminal of the semiconductor device;
  wherein, in response to the combined current being applied to the input terminal of the semiconductor device, a device current flowing through an output terminal of the semiconductor device is equivalent to the multiple of the reference current.

14. The system of claim 13, wherein the second circuit is operable to generate a first mirror current equivalent to one of:
  the control current; and
  the control current divided by a specified value (N);
  wherein the second circuit is operable to provide the first mirror current to the third circuit.

15. The system of claim 14, wherein the third circuit is operable to conduct a sum current comprising a sum total of the first mirror current and the reference current.

16. The system of claim 15, wherein the third circuit is operable to generate one of:
  a second mirror current equivalent to the sum current, wherein the combined current comprises the second mirror current; and
  N component mirror currents, wherein each one of the N component mirror currents is equivalent to the sum current, and wherein the combined current comprises a sum total of the N component mirror currents.

17. The system of claim 14, wherein the second circuit is operable to split the control current into N equal-size component currents, wherein the first mirror current is equivalent to one of the N equal-size component currents.

18. The system of claim 13, wherein the first circuit is operable to adjust the reference current to maximize the combined current without the combined current exceeding a specified value.

19. The system of claim 18, wherein the first circuit is operable to adjust the reference current when the combined current is equivalent to a sum total of the control current and the reference current, to maximize the combined current without the combined current exceeding a specified value.

20. The system of claim 18, wherein the first circuit comprises a digital control block operable to set the reference current to one of a plurality of specified values.

21. The system of claim 20, wherein the digital control block comprises a plurality of control outputs;
  wherein the first circuit further comprises a plurality of parallel-coupled transistors, a respective input terminal of each of the plurality of parallel-coupled transistors switchably coupled to a respective one of the plurality of control outputs;
  wherein the reference current comprises a sum total of a plurality of individual currents, each of the plurality of individual currents flowing into the respective input terminal of a respective one of the plurality of parallel-coupled transistors.

22. The system of claim 20, wherein the digital control block is configured to receive a detection current from the third circuit;
  wherein the digital control block is operable to set the reference current to an initial value and increment the reference current until the detection current exceeds the specified value.

23. The system of claim 22, wherein the digital control block is operable to increment the reference current in discrete steps, and decrement the reference current by a single discrete step in response to the detection current exceeding the specified value.

24. The system of claim 13, wherein the first circuit and the second circuit comprise NMOS devices and PMOS devices.

25. A temperature monitoring system comprising:
a semiconductor device having a defined, generally non-linear input-output characteristic that varies with temperature; and
a current control circuit configured to couple to the semiconductor device and comprising:
  a first circuit configured to generate a reference current;
  a second circuit configured to couple to the first circuit, and operable to receive a control current flowing through a control terminal of the semiconductor device; and
  a third circuit configured to couple to the first circuit and to the second circuit, and operable to conduct a combined current equivalent to a sum total of the control current and a multiple of the reference current, and further operable to provide the combined current to an input terminal of the semiconductor device;
  wherein, in response to the combined current being applied to the input terminal of the semiconductor device, a device current flowing through an output terminal of the semiconductor device is equivalent to the multiple of the reference current.

26. The temperature monitoring system of claim 25, further comprising an analog-to-digital converter (ADC) configured to couple to the semiconductor device;
  wherein in response to the combined current being applied to the input terminal of the semiconductor device, the semiconductor device is operable to develop an output voltage across its input terminal and control terminal;
  wherein the output voltage has a respective value corresponding to each different multiple of the reference current;
  wherein the ADC is operable to produce a numeric value corresponding to a temperature of the semiconductor device in response to at least two different respective values of the output voltage.

27. The system of claim 26, wherein the semiconductor device comprises a PN-junction, and wherein the control terminal and the input terminal correspond to terminals of the PN-junction.

28. The system of claim 27, wherein the output voltage comprises a base-emitter voltage developed across the PN-junction.

29. The system of claim 27, wherein the PN-junction is comprised in a bipolar junction transistor (BJT), wherein the control terminal is the base of the BJT and the input terminal is the emitter of the BJT.

30. The system of claim 26, wherein the ADC is one of:
a pipeline ADC;
a cyclic ADC;
a delta-sigma ADC;
a successive approximation ADC; and
an integrating ADC.

31. A method for controlling current in a semiconductor device, the method comprising:
obtaining a control current based on a first device current flowing through a control terminal of the semiconductor device, wherein a value of the control current is equal to a value of the first device current divided by N, wherein N is an integer greater than or equal to 1;
generating a mirrored instance of the control current at a first node;
applying a first current to the first node to obtain a sum current comprising a sum of the mirrored instance of the control current and the first current;
generating N mirrored instances of the sum current at a second node coupled to an input terminal of the semiconductor device; and
generating a second device current flowing through an output terminal of the semiconductor device, wherein in response to said mirroring the sum current, a value of the second device current is equal to N times a value of the first current.

32. The method of claim 31, wherein said obtaining the control current comprises splitting the first device current into N component currents, wherein a value of at least one of the N component currents is equal to the value of the first device current divided by N, wherein the control current is the at least one of the N component currents.

33. The method of claim 31, wherein said applying the first current comprises:
generating a reference current; and
generating a mirrored instance of the reference current at the first node, wherein the mirrored instance of the reference current is the first current.

34. A system for controlling a first device current flowing through an output terminal of a semiconductor device, the system comprising:
a first node configured to couple to an input terminal of the semiconductor device;
a second node configured to receive a reference current;
a second circuit configured to:
  receive a second device current flowing through a control terminal of the semiconductor device;
  generate a control current based on the second device current, wherein a value of the control current is equal to a value of the second device current divided by N, wherein N is an integer greater than or equal to 1; and
  generate a mirrored instance of the control current at the second node to obtain a sum current comprising a sum of the mirrored instance of the control current and the reference current; and
a third circuit configured to:
  receive the sum current; and
  generate N mirrored instances of the sum current at the first node to adjust the second device current to have a value equal to N times a value of the reference current.

35. The system of claim 34, wherein the second circuit is configured to:
split the second device current into N component currents, wherein a value of at least one of the N component currents is equal to the value of the second device current divided by N, wherein the control current is the at least one of the N component currents.

36. The system of claim 34, further comprising a current source configured to generate the reference current.

37. The system of claim 34, further comprising:
a current source configured to generate a first current; and
a fourth circuit configured to generate a mirrored instance of the first current at the second node, wherein the mirrored instance of the first current is the reference current.

* * * * *